United States Patent
Miller et al.

(10) Patent No.: US 10,486,704 B2
(45) Date of Patent: Nov. 26, 2019

(54) POWERTRAIN FAULT MANAGEMENT

(71) Applicant: Ford Global Technologies, LLC, Dearborn, MI (US)

(72) Inventors: Kenneth James Miller, Canton, MI (US); Thomas G. Leone, Ypsilanti, MI (US); Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 196 days.

(21) Appl. No.: 15/671,619

(22) Filed: Aug. 8, 2017

(65) Prior Publication Data

US 2019/0047566 A1    Feb. 14, 2019

(51) Int. Cl.
*B60W 30/184*  (2012.01)
*B60W 10/06*   (2006.01)
*B60W 10/10*   (2012.01)
*B60W 30/188*  (2012.01)

(52) U.S. Cl.
CPC ........ *B60W 30/1843* (2013.01); *B60W 10/06* (2013.01); *B60W 10/10* (2013.01); *B60W 30/188* (2013.01); *B60W 2510/0676* (2013.01); *B60W 2510/107* (2013.01); *B60W 2710/0677* (2013.01); *B60W 2710/1061* (2013.01)

(58) Field of Classification Search
CPC .. B60W 30/1843; B60W 10/06; B60W 10/10; B60W 30/188; B60W 2510/0676; B60W 2510/107; B60W 2710/0677; B60W 2710/1061
See application file for complete search history.

(56) References Cited

U.S. PATENT DOCUMENTS

| 2,606,626 | A  | 8/1952  | Meyer |
| 2,758,218 | A  | 8/1956  | Poznik |
| 3,851,723 | A  | 12/1974 | Pagdin |
| 5,219,413 | A  | 6/1993  | Lineberger |
| 6,577,909 | B1 | 6/2003  | McGowan et al. |
| 6,687,592 | B2 | 2/2004  | Grob et al. |
| 7,223,205 | B2 | 5/2007  | Etchason et al. |
| 8,342,272 | B2 | 1/2013  | Gee |
| 9,141,112 | B1 | 9/2015  | Loo et al. |
| 10,036,333 | B2 | 7/2018 | Leone et al. |
| 10,214,219 | B2 | 2/2019 | Richards et al. |

(Continued)

FOREIGN PATENT DOCUMENTS

DE  102012020408 B4  5/2015
WO  WO 2016030486 A1  3/2016

OTHER PUBLICATIONS

Non-Final Office Action dated Mar. 8, 2019 regarding U.S. Appl. No. 15/671,630 (19 pages).

(Continued)

*Primary Examiner* — Calvin Cheung
(74) *Attorney, Agent, or Firm* — Frank A. MacKenzie; Bejin Bieneman PLC

(57) ABSTRACT

A computer is programmed to cap power provided by a powertrain to a power limit in response to data indicating a critical condition of the powertrain; and provide power from the powertrain above the power limit in response to a demand for acceleration above an acceleration threshold. The computer may be programmed to cap power provided by the powertrain above the power limit to an energy limit.

20 Claims, 5 Drawing Sheets

(56) References Cited

U.S. PATENT DOCUMENTS

| | | |
|---|---|---|
| 2002/0163198 A1 | 11/2002 | Gee |
| 2004/0178635 A1* | 9/2004 | Gray, Jr. .................. B60K 6/10 290/40 C |
| 2008/0249667 A1 | 10/2008 | Horvitz et al. |
| 2010/0138142 A1 | 6/2010 | Pease |
| 2011/0282527 A1 | 11/2011 | Inbarajan et al. |
| 2012/0109515 A1 | 5/2012 | Uyeki et al. |
| 2016/0231746 A1 | 8/2016 | Hazelton et al. |
| 2017/0281441 A1 | 10/2017 | Fich |
| 2018/0105158 A1 | 4/2018 | Namuduri et al. |

OTHER PUBLICATIONS

Non-Final Office Action dated Oct. 18, 2018 for U.S. Appl. No. 15/671,650 (35 pages).

* cited by examiner

POWERTRAIN FAULT MANAGEMENT

BACKGROUND

A vehicle powertrain typically includes an engine, a torque converter, and a transmission coupled in series, as well as a differential axle and sometimes a 4-wheel-drive transfer case. If the engine is an internal-combustion engine, the engine includes cylinders that serve as combustion chambers that convert fuel to rotational kinetic energy. The torque converter transmits rotational motion from the engine to the transmission while allowing slippage between the engine and transmission, for example, while the engine is running and the vehicle is stopped. The transmission transmits the kinetic energy from the torque converter to a drive axle and ultimately to wheels of the vehicle, while applying a gear ratio allowing different tradeoffs between torque and rotational speed. Overheating and other faults can cause the powertrain to malfunction and/or damage the powertrain.

DETAILED DESCRIPTION

Figure 1:
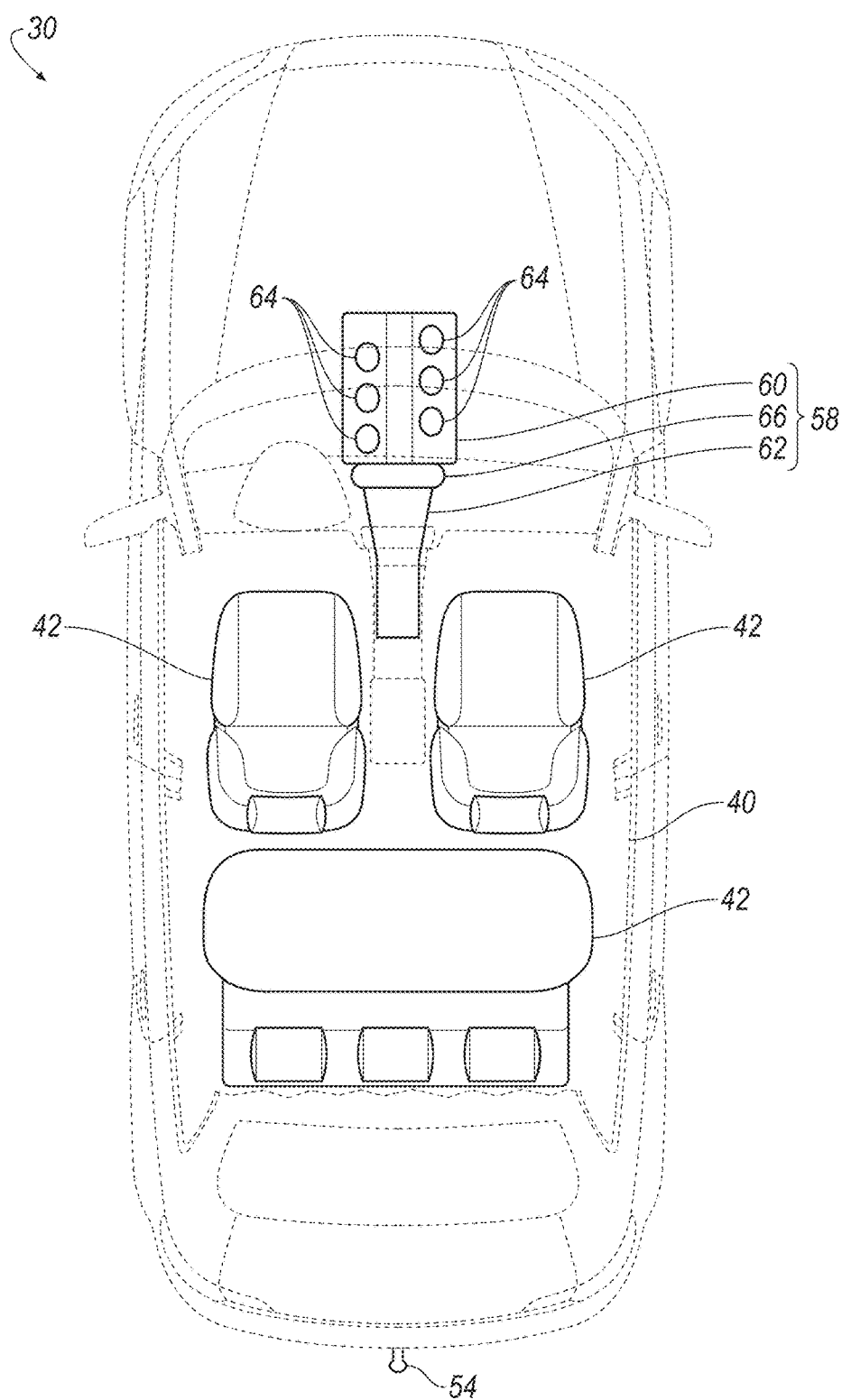
FIG. 1 is a top view of an example vehicle.

In response to overheating and other faults, operability of the powertrain may need to be limited. The vehicle described below provides a system for responding to powertrain malfunctions and overheating in way that balances continued operability of the powertrain and the experience of vehicle occupants, if any. A system includes a computer and powertrain components in communication with the computer. The computer instructs the powertrain components to modify powertrain operation in a manner that can prolong complete failure of the powertrain without overly burdening occupants with noise, vibration, and harshness. The system can increase the likelihood that the vehicle reaches its destination without damaging the powertrain.

A system including a computer programmed to cap power provided by a powertrain to a power limit in response to data indicating a critical condition of the powertrain, and provide power from the powertrain above the power limit in response to a demand for acceleration above an acceleration threshold.

The computer may be further programmed to cap power provided by the powertrain above the power limit to an energy limit.

The power limit may be a fraction less than one of power demanded from the powertrain.

The power limit may be a preset power value.

The critical condition may be a temperature of the powertrain exceeding a temperature threshold. The power limit may be a fraction less than one of power demanded from the powertrain. The temperature threshold may be a first temperature threshold, and the computer may be further programmed to cap power provided by the powertrain to a preset power value in response to data indicating that the temperature of the powertrain exceeds a second temperature threshold. The second temperature threshold may be greater than the first temperature threshold.

The fraction may be a first fraction and the temperature threshold may be a first temperature threshold, the computer may be further programmed to cap power provided by the powertrain to a second fraction of power demanded from the powertrain in response to data indicating that the temperature of the powertrain exceeds the second temperature threshold, and the second fraction may be less than the first fraction, and the second temperature threshold may be greater than the first temperature threshold.

The computer may be further programmed to determine the temperature threshold based on an ambient temperature.

A method includes capping power provided by a powertrain to a power limit in response to data indicating a critical condition of the powertrain, and providing power from the powertrain above the power limit in response to a demand for acceleration above an acceleration threshold.

The method may include capping power provided by the powertrain above the power limit to an energy limit.

The power limit may be a fraction less than one of power demanded from the powertrain.

The power limit may be a preset power value.

The critical condition may be a temperature of the powertrain exceeding a temperature threshold. The power limit may be a fraction less than one of power demanded from the powertrain. The temperature threshold may be a first temperature threshold, and the method may further include capping power provided by the powertrain to a preset power value in response to data indicating that the temperature of the powertrain exceeds a second temperature threshold. The second temperature threshold may be greater than the first temperature threshold.

The fraction may be a first fraction and the temperature threshold may be a first temperature threshold, and the method may further include capping power provided by the powertrain to a second fraction of power demanded from the powertrain in response to data indicating that the temperature of the powertrain exceeds the second temperature threshold, and the second fraction may be less than the first fraction, and the second temperature threshold may be greater than the first temperature threshold.

The method may include determining the temperature threshold based on an ambient temperature.

Figure 2:
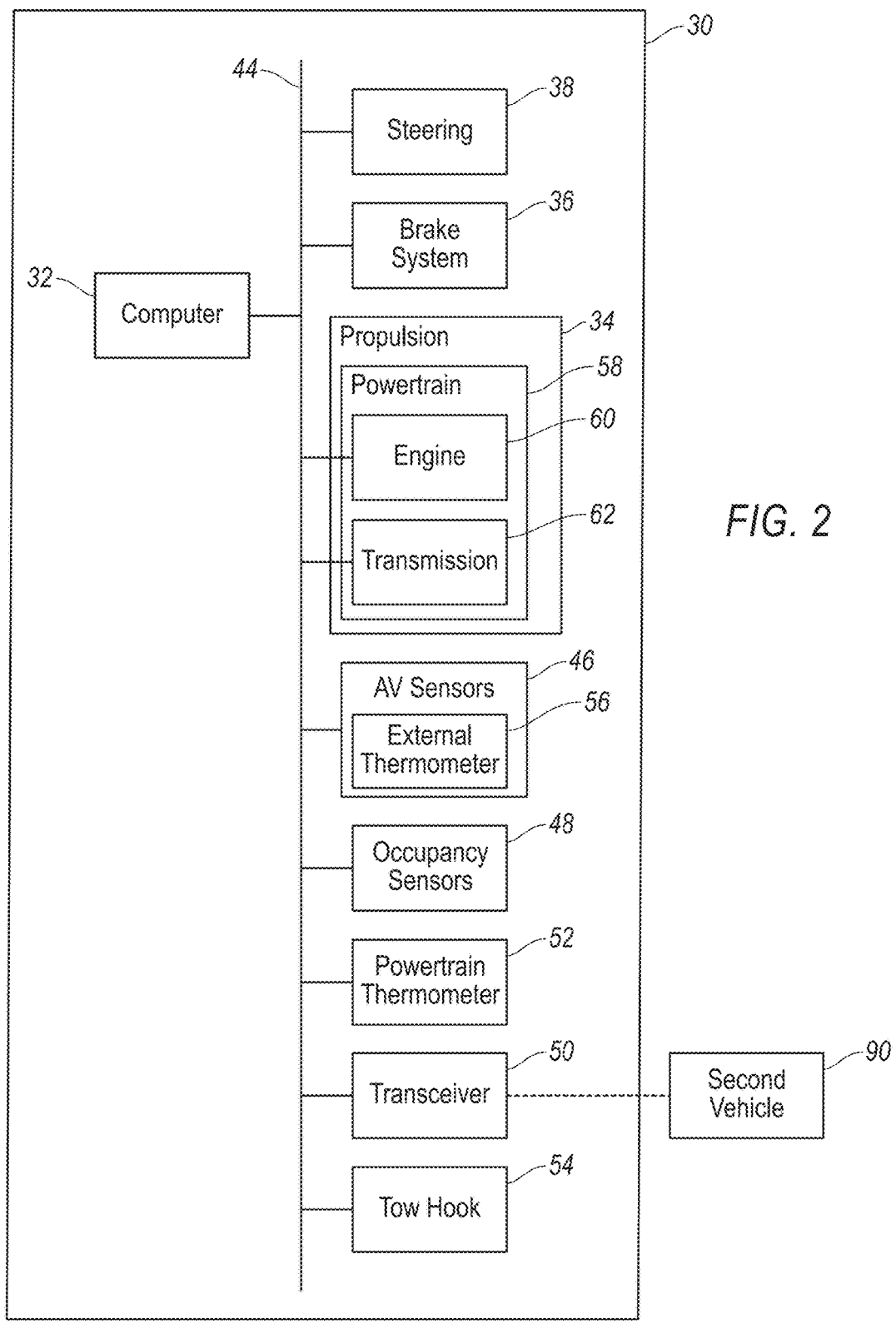
FIG. 2 is a block diagram of the vehicle.

With reference to FIGS. 1 and 2, a vehicle 30 may be an autonomous vehicle. A computer 32 can be configured to operate the vehicle 30 independently of the intervention of a human driver, completely or to a lesser degree. The computer 32 may be programmed to operate a propulsion 34, brake system 36, steering 38, and/or other vehicle systems. For the purposes of this disclosure, autonomous operation means the computer 32 controls the propulsion 34, brake system 36, and steering 38; semi-autonomous operation means the computer 32 controls one or two of the propulsion 34, brake system 36, and steering 38 and a human driver controls the remainder; and nonautonomous operation means the human driver controls the propulsion 34, brake system 36, and steering 38.

With reference to FIG. 1, the vehicle 30 includes a passenger cabin 40 to house occupants, if any, of the vehicle 30. The passenger cabin 40 includes one or more seats 42 disposed in a first row at a front of the passenger cabin 40 and in a second row behind the first row. The passenger cabin 40 may also include seats 42 in a third row (not shown) at a rear of the passenger cabin 40. The position and orientation of the seats 42 and components thereof may have a different arrangement and/or be adjustable by an occupant.

With reference to FIG. 2, the computer 32 is a microprocessor-based computer. The computer 32 includes a processor, memory, etc. The memory of the computer 32 includes memory for storing instructions executable by the processor as well as for electronically storing data and/or databases. The computer 32 may be a single computer or multiple computers networked together. For example, the computer 32 may include distinct electronic control units (ECUs) or the like, e.g., a powertrain control module (PCM) and an autonomous-vehicle control module (AVCM), in communication with each other.

The computer 32 may transmit signals through a communications network 44 such as a controller area network (CAN) bus, Ethernet, WiFi, Local Interconnect Network (LIN), onboard diagnostics connector (OBD-II), and/or by any other wired or wireless communications network. The computer 32 may be in communication with the brake system 36, the steering 38, components of the propulsion 34, AV sensors 46, occupancy sensors 48, a transceiver 50, a powertrain thermometer 52, a tow attachment 54, and other components.

The AV sensors 46 may provide data about operation of the vehicle 30, for example, wheel speed, wheel orientation, and engine and transmission data (e.g., temperature, fuel consumption, etc.). The AV sensors 46 may detect the location and/or orientation of the vehicle 30. For example, the AV sensors 46 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The AV sensors 46 may detect the external world, i.e., phenomena outside the vehicle 30. For example, the sensors may include radar sensors, scanning laser range finders, light detection and ranging (LIDAR) devices, and image processing sensors such as cameras.

The AV sensors 46 may include an external thermometer 56 to measure an ambient temperature, i.e., a temperature of surrounding air of the external environment. The external thermometer 56 may be any suitable type, e.g., magnetic, bimetallic strip, etc. The external thermometer 56 may be disposed at any location at which the external thermometer 56 can achieve thermal equilibrium with the external environment.

The occupancy sensors 48 are configured to detect occupancy of the seats 42. The occupancy sensors 48 may be visible-light or infrared cameras directed at the seats 42, weight sensors inside the seats 42, sensors detecting whether seatbelts for the seats 42 are buckled or unspooled, a human-machine interface (HMI) allowing input from an occupant that the occupant is present, or other suitable sensors.

The transceiver 50 is adapted to transmit signals wirelessly through any suitable wireless communication protocol, such as Bluetooth®, WiFi, IEEE 802.11a/b/g, other RF (radio frequency) communications, etc. The transceiver 50 may be adapted to communicate with a remote server, that is, a server distinct and spaced from the vehicle 30. The remote server may be located outside the vehicle 30. For example, the remote server may be associated with other vehicles (e.g., V2V communications), infrastructure components (e.g., V2I communications), emergency responders, mobile devices associated with the owner of the vehicle 30, etc. The transceiver 50 may be one device or may include a separate transmitter and receiver.

The steering 38 is typically a known vehicle steering subsystem and controls the turning of vehicle 30 wheels of the vehicle 30. The steering 38 may be a rack-and-pinion system with electric power-assisted steering, a steer-by-wire system, as both are known, or any other suitable system. The steering 38 can include an electronic control unit (ECU) or the like that is in communication with and receives input from the computer 32 and/or a human driver. The human driver may control the steering 38 via, e.g., a steering wheel.

With continued reference to FIG. 2, the brake system 36 is typically a known vehicle braking subsystem and resists the motion of the vehicle 30 to thereby slow and/or stop the vehicle 30. The brake system 36 may include friction brakes such as disc brakes, drum brakes, band brakes, etc.; regenerative brakes; any other suitable type of brakes; or a combination. The brake system 36 can include an electronic brake control unit (BCU) or the like that is in communication with and receives input from the computer 32 and/or a human driver. The human driver may control the brake system 36 via, e.g., a brake pedal.

With reference to FIGS. 1 and 2, the propulsion 34 of the vehicle 30 generates energy and translates the energy into motion of the vehicle 30. The propulsion 34 includes a powertrain 58, which may include an engine 60 and a transmission 62 rotatably coupled to the engine 60. The propulsion 34 may be a known vehicle propulsion subsystem; for example, the powertrain 58 may include the engine 60 using internal combustion coupled to the transmission 62 that transfers rotational motion to wheels; may be electric and include batteries, an electric motor, and the transmission 62 that transfers rotational motion to the wheels; may be hybrid and include internal-combustion and electric elements; or may be any other type of propulsion. The propulsion 34 can include an electronic control unit (ECU) or the like that is in communication with and receives input from the computer 32 and/or a human driver. The engine 60, transmission 62, etc., may be in communication with the computer 32 directly or via the ECU. A human driver may control the propulsion 34 via, e.g., an accelerator pedal and/or a gear-shift lever.

The engine 60 may be an internal-combustion engine, an electric motor, or both. In an internal-combustion or hybrid engine, the engine 60 includes a plurality of cylinders 64. The cylinders 64 operate as combustion chambers in which a chemical reaction of a fuel translates into kinetic energy of a piston (not shown) of the cylinder 64. The pistons of the cylinders 64 are coupled to the transmission 62 such that linear movement of the pistons drives rotational motion of the transmission 62. The pistons may be coupled directly or indirectly, e.g., via a torque converter 66. The cylinders 64 of the engine 60 fire in a predefined sequence.

The engine 60 has an engine speed. The engine speed is measured as a rate of revolutions, e.g., revolutions per minute (rpm), of an output shaft (not shown) coupled to the transmission 62. The strokes of the pistons drive the shaft. Changing the rate of piston firing changes the engine speed.

The engine 60 may use all the cylinders 64 to power the vehicle 30 or may use a set of active cylinders 64 including less than all the cylinders 64. For example, if the engine 60 has six cylinders 64, then all six cylinders 64 may fire in a sequence, four cylinders 64 may fire in a sequence, three cylinders 64 may fire in a sequence, or some other number of cylinders 64 may fire in a sequence. The number of cylinders 64 firing affects the noise, vibration, and harshness (NVH) experienced by occupants of the vehicle 30, if any. For example, depending on the configuration of the engine 60, firing fewer than all the cylinders 64 increases the NVH for occupants compared to firing all the cylinders 64, and firing an odd number of cylinders 64 increases the NVH for the occupants compared to firing an even number of cylinders 64.

With continued reference to FIGS. 1 and 2, the transmission 62 is coupled to the output shaft of the engine 60, that is, directly or indirectly drivably connected to the engine 60. The transmission 62 transmits power generated by the engine 60 to a drive axle connected to wheels (not shown). The transmission 62 can change the gear ratio between input from the engine 60 and output to the drive axle. The transmission 62 may be any suitable type of transmission 62, including an automatic transmission with a set of defined gear ratios, called gears, or a continuously variable transmission. At higher gear ratios or lower gears, the transmission 62 transmits more torque at a higher engine speed to the drive axle, and at lower gear ratios or higher gears, the transmission 62 receives torque from the engine 60 at a slower engine speed for a given speed of the drive axle and transmits less torque to the drive axle.

The transmission 62 can shift between gears. The transmission 62 includes a plurality of physical gears engaged with one another, and a hydraulic system including a pump (not shown), as is known. The hydraulic system changes the engagements of the physical gears, which changes the gear (e.g., from first to second). Transmission-shift time, for the purposes of this disclosure, refers to the time from when the transmission 62 begins the transition to disengage from one gear, e.g., first, to when the transmission 62 completes the engagement in another gear, e.g., second. Increasing the pressure of the hydraulic system decreases the transmission-shift time, i.e., lowers the time for the transmission 62 to shift gears, as well as increasing NVH.

A shift schedule may determine the gear ratio of the transmission 62 as a function of the vehicle speed and the position of an accelerator pedal (not shown). For an automatic transmission, a shift schedule indicates the conditions under which the transmission 62 will shift between two gears. The shift schedule may be represented as a series of thresholds for shifting between pairs of consecutive gears, and the thresholds are functions of the vehicle speed, the pedal position or some other measure of desired vehicle demand (such as an output of an autonomous-driving algorithm), and whether the shift is an upshift or downshift. The pedal is an input device, such as a floor pedal, through which an occupant indicates a desired change in the vehicle acceleration or speed. Lugging, for the purposes of this disclosure, means that the transmission 62 delivers demanded torque at a lower engine speed and/or higher gear than normally dictated by the shift schedule. Lugging may result in increased NVH such as vibrations being experienced by an occupant.

With reference to FIG. 2, one or more powertrain thermometers 52 are attached to the powertrain 58 to monitor whether the powertrain 58 is operating at a safe temperature. The powertrain thermometer 52 may be any suitable type, e.g., magnetic, bimetallic strip, etc. The powertrain thermometer 52 may be disposed at any location at which a temperature reading correlates with operability of the powertrain 58. For example, the powertrain thermometer 52 may be located so that coolant exiting a cylinder head or upper radiator hose (not shown) flows over the powertrain thermometer 52.

With reference to FIGS. 1 and 2, the vehicle 30 may include the tow attachment 54 for attaching a trailer to the vehicle 30. The tow attachment 54 provides a structure to which the trailer can releasably attach. The tow attachment 54 may be operable to couple to and release from the trailer. Alternatively, the tow attachment 54 may be located on the trailer and in communication with the computer 32 via a wired connection or wireless connection through the transceiver 50. The tow attachment 54 on the trailer may be operable to couple to and release from a structure of the vehicle 30. Alternatively, the tow attachment 54 may be manually operable by an occupant of the vehicle 30.

Figure 3:
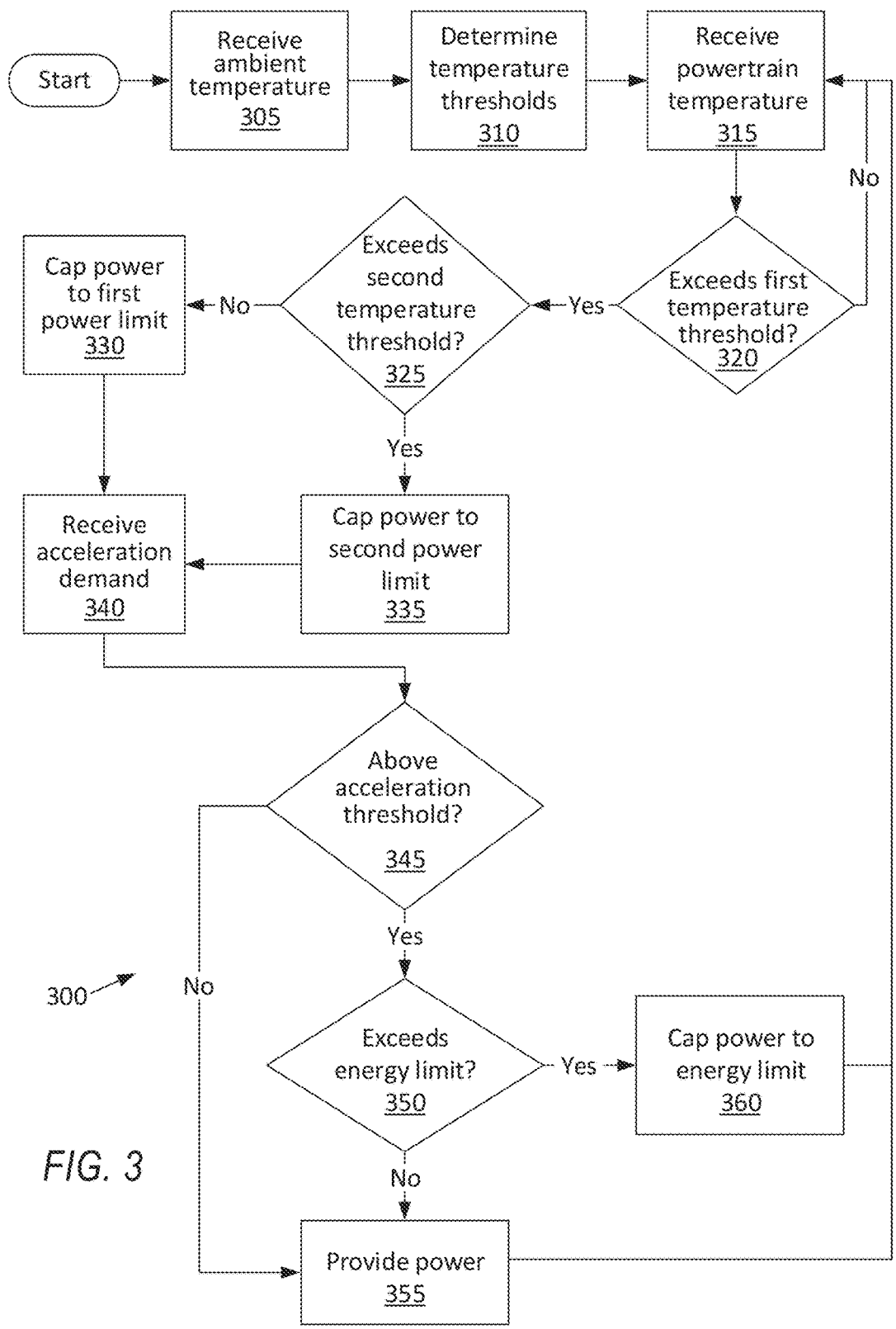
FIG. 3 is a process flow diagram of an example process for controlling powertrain output.

FIG. 3 is a process flow diagram illustrating an exemplary process 300 for controlling output of the powertrain 58. The memory of the computer 32 stores programming for performing the steps of the process 300.

The process 300 begins in a block 305, in which the computer 32 receives an ambient temperature. The external thermometer 56 detects the ambient temperature and transmits a signal through the communications network 44 to the computer 32.

Next, in a block 310, the computer 32 determines a first temperature threshold and a second temperature threshold. (The adjectives "first" and "second" are used throughout this document as identifiers and are not intended to signify importance or order.) The temperature thresholds may be preset values, and the computer 32 may look up the temperature thresholds in its memory. Alternatively, the temperature thresholds may be based on the ambient temperature. For example, the temperature thresholds may each be an increasing function of the ambient temperature, e.g., $T_1 = a_1 \times T_{amb} + b_1$ and $T_2 = a_2 \times T_{amb} + b_2$, in which $T_1$ is the first temperature threshold; $T_2$ is the second temperature threshold; $T_{amb}$ is the ambient temperature; and $a_1$, $b_1$, $a_2$, and $b_2$ are constants. The constants $a_1$, $b_1$, $a_2$, and $b_2$ may be determined by experiments in which engines are run in high-ambient-temperature environments to determine failure conditions. For another example, values of the temperature thresholds may be stored in lookup tables with corresponding values of the ambient temperature. The values of the temperature thresholds for each value of the ambient temperature may be determined by experiments in which engines are run in high-ambient-temperature environments to determine failure conditions. The second temperature threshold is greater than the first temperature threshold; more specifically, if the temperature thresholds are based on the ambient temperature, the second temperature threshold is greater than the first temperature threshold for each value of the ambient temperature.

Next, in a block 315, the computer 32 receives a temperature of the powertrain 58. The powertrain thermometer 52 detects the powertrain temperature and transmits a signal through the communications network 44 to the computer 32.

Next, in a decision block 320, the computer 32 determines whether it has received data indicating a critical condition of the powertrain 58. The critical condition may be that the temperature of the powertrain 58 exceeds the first temperature threshold, in other words, that the powertrain 58 is overheating. If the temperature of the powertrain 58 does not exceed the first temperature threshold, the process 300 returns to the block 315; that is, the computer 32 continues to monitor the temperature of the powertrain 58.

If the temperature of the powertrain 58 exceeds the first temperature threshold, next, in a decision block 325, the computer 32 determines whether the temperature of the powertrain 58 exceeds the second temperature threshold. If the temperature of the powertrain 58 exceeds the second temperature threshold, the process 300 proceeds to a block 335.

If the temperature of the powertrain 58 does not exceed the second temperature threshold, next, in a block 330, the computer 32 caps the power provided by the powertrain 58 to a first power limit. The first power limit may be a preset power value, measured in units of energy per time, e.g., horsepower, watts, etc. Alternatively, the first power limit may be a fraction less than one of power demanded from the powertrain 58, e.g., 90%. The first power limit may be determined experimentally, e.g., by an experiment to determine what power level typically allows the powertrain 58 with a temperature between the first and second temperature thresholds to continue operating.

If the temperature of the powertrain 58 exceeds the second temperature threshold, in the block 335, the computer 32 caps the power provided by the powertrain 58 to a second power limit. The second power limit may be a preset power value that is lower than the preset value of the first power limit. Alternatively, the second power limit may be a fraction less than one of power demanded from the powertrain 58 that is less than the fraction of the first power limit, e.g., 75%. The second power limit may be determined experimentally, e.g., by an experiment to determine what power level typically allows the powertrain 58 with a temperature above the second temperature threshold to continue operating.

After the block 330 or the block 335, in a block 340, the computer 32 receives an acceleration demand. "Acceleration demand," for the purposes of this disclosure, refers to an instruction to the propulsion 34 for a level of acceleration, whether the instruction includes a value of acceleration or implicitly requests acceleration, e.g., by requesting an increased value of speed. The acceleration demand may be generated by, e.g., an autonomous-driving algorithm, as is known, based on driving conditions such as surrounding environment, other vehicles and objects, rules of the road, etc.

Next, in a decision block 345, the computer 32 determines whether the acceleration demand is above an acceleration threshold. The acceleration threshold may be a value stored in the memory of the computer 32. The acceleration threshold may be determined to correspond to driving events for which higher acceleration is demanded, such as taking an onramp onto a freeway, completing a pass of another vehicle, avoiding an incoming vehicle, etc. If the acceleration demand does not exceed the acceleration threshold, the process 300 proceeds to a block 355.

If the acceleration demand exceeds the acceleration threshold, next, in a decision block 350, the computer 32 determines whether the acceleration demand exceeds an energy limit. The energy limit, for the purposes of this disclosure, is a total quantity of energy above the first or second power limit that the powertrain 58 is allowed to supply. The energy limit may be a value, e.g., a measurement in units of energy such as Joules, stored in the memory of the computer 32. The energy limit may be determined by experiment, e.g., by an experiment to determine a total energy above the power limit that the powertrain 58 can typically supply while continuing to operate without causing damage to the life of the powertrain 58. If the acceleration demand would exceed the energy limit, the process 300 proceeds to a block 360.

If the acceleration demand does not exceed the acceleration threshold, after the decision block 345, or if the acceleration demand would not exceed the energy limit, after the decision block 350, in the block 355, the computer 32 provides power from the powertrain 58 even if the power exceeds the first or second power limit (as instituted in the block 330 or the block 335). After the block 355, the process 300 returns to the block 315.

If the acceleration demand would exceed the energy limit, after the decision block 350, in the block 360, the computer 32 caps the power provided by the powertrain 58 above the first or second power limit to the energy limit. If the energy limit has already been exceeded, the computer 32 caps the power provided by the powertrain 58 to the first or second power limit. If the energy limit will be exceeded by the acceleration demand, the computer 32 allows the powertrain 58 to provide power above the first or second power limit up to the energy limit but then caps the power provided by the powertrain 58 to the first or second power limit. After the block 360, the process 300 returns to the block 315.

Figure 4:
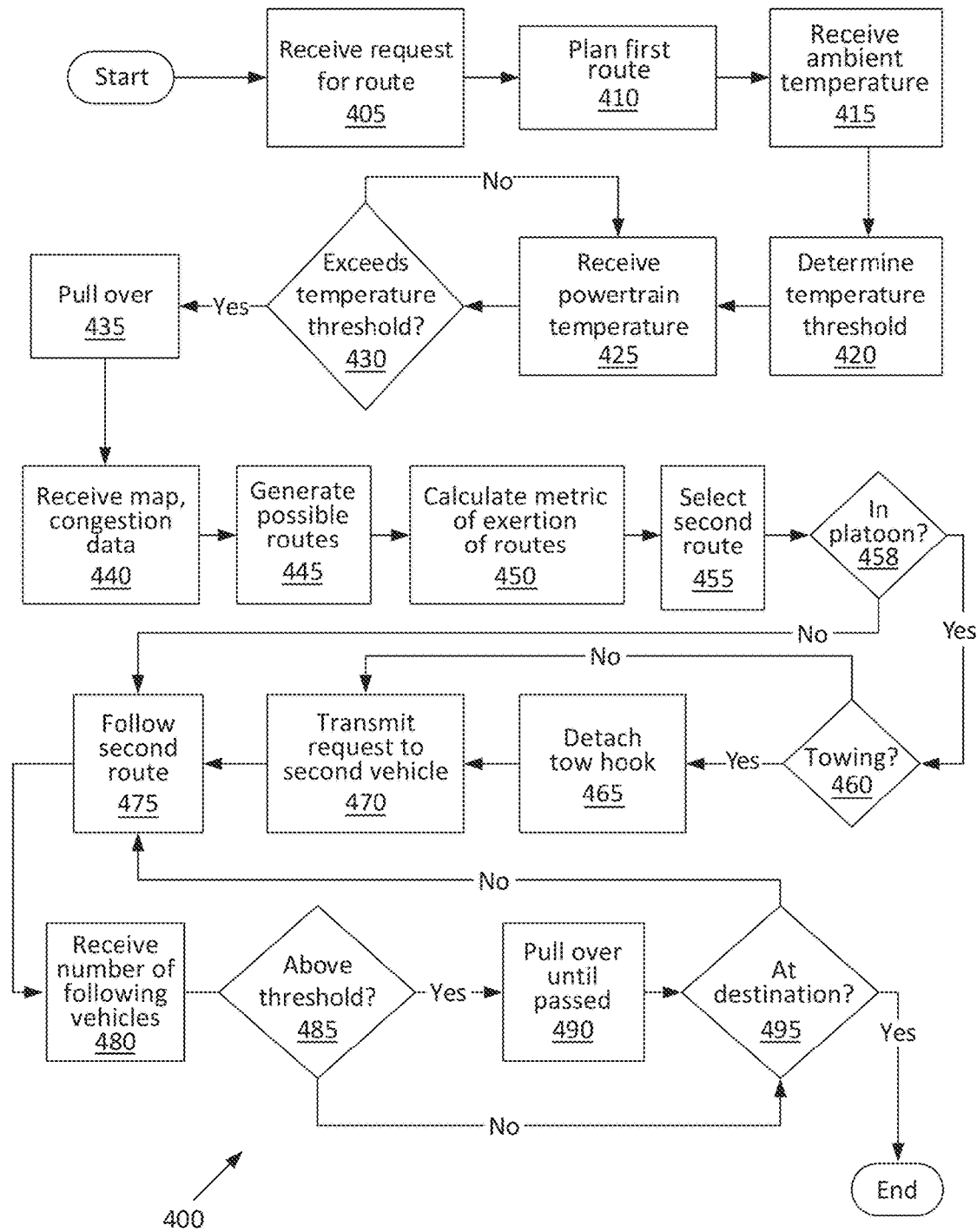
FIG. 4 is a process flow diagram of an example process for planning a route based on powertrain conditions.

FIG. 4 is a process flow diagram illustrating an exemplary process 400 for planning a route based on powertrain conditions. The memory of the computer 32 stores programming for performing the steps of the process 400. In the process 400, the vehicle 30 is a first vehicle 30 in a platoon that includes one or more second vehicles 90. ("First" and "second" do not necessarily refer to arrangement within the platoon.) A "platoon" is a group of vehicles 30, 90 that are traveling together in a coordinated manner (e.g., with respect to speed, heading, etc.). The vehicles 30, 90 may be in communication with each other via the transceiver 50 (as shown in FIG. 2) and may form a wireless ad hoc network using a dedicated short-range communications (DSRC) standards and protocols. The vehicles 30, 90 may send message about impending obstacles, traffic signals, etc.; intended actions; and so on. The vehicles 30, 90 in the platoon may coordinate maneuvers such as braking over the ad hoc network. The communication and coordination of maneuvers such as braking allows the vehicles 30, 90 to travel more closely together than vehicles that are not in a platoon.

The process 400 begins in a block 405, in which the computer 32 receives a request for a route to a destination. The request may be received via, e.g., user input.

Next, in a block 410, the computer 32 plans a first route to the destination. The computer 32 may use a route-planning algorithm such as Dijkstra's algorithm, A*, D*, and others, as are known, to generate the first route. The algorithm may minimize travel time, travel distance, etc.

Next, in a block 415, the computer 32 receives an ambient temperature. The external thermometer 56 detects the ambient temperature and transmits a signal through the communications network 44 to the computer 32.

Next, in a block 420, the computer 32 determines a temperature threshold. The temperature threshold may be a preset value, and the computer 32 may look up the temperature threshold in its memory. Alternatively, the temperature threshold may be based on the ambient temperature. For example, the temperature threshold may be an increasing function of the ambient temperature, e.g., $T=a \times T_{amb}+b$, in which T is the temperature threshold; $T_{amb}$ is the ambient temperature; and a and b are constants. The constants a and b may be determined by experiments in which engines are run in high-ambient-temperature environments to determine failure conditions. For another example, values of the temperature threshold may be stored in lookup tables with corresponding values of the ambient temperature. The values of the temperature threshold for each value of the ambient temperature may be determined by experiments in which engines are run in high-ambient-temperature environments to determine failure conditions.

Next, in a block 425, the computer 32 receives a temperature of the powertrain 58. The powertrain thermometer 52 detects the powertrain temperature and transmits a signal through the communications network 44 to the computer 32.

Next, in a decision block 430, the computer 32 determines whether it has received data indicating a critical condition of the powertrain 58. The critical condition may be that the temperature of the powertrain 58 exceeds the temperature threshold, in other words, that the powertrain 58 is overheating. If the temperature of the powertrain 58 does not exceed the temperature threshold, the process 400 returns to the block 425; that is, the computer 32 continues to monitor the temperature of the powertrain 58.

If the temperature of the powertrain 58 exceeds the temperature threshold, next, in a block 435, the computer 32 instructs the first vehicle 30 to pull over. For example, the computer 32 may use the autonomous-driving algorithm to instruct the propulsion 34, steering 38, and brake system 36 to move the first vehicle 30 to a shoulder or side of a road on which the first vehicle 30 is driving and to slow and stop the first vehicle 30.

Next, in a block 440, the computer 32 receives map data and traffic data. The map data is typically conventional map data as provided in a vehicle navigation system and typically includes data about road locations and lengths, local traffic regulations for the roads, topographical data, etc. The computer 32 may receive the map data via the transceiver 50 or by looking up the map data from the memory. The traffic data can include for a particular road or a segment (e.g., one mile, two miles) of a road, a number of vehicles of the road, average speeds of vehicles on the road or road segment, delays if any, etc.

Next, in a block 445, the computer 32 generates a plurality of possible routes from a current location of the first vehicle 30 to the destination. The computer 32 may generate the possible routes in the process of using a route-planning algorithm such as Dijkstra's algorithm, A*, D*, and others, as are known.

Next, in a block 450, the computer 32 calculates a metric of exertion by the powertrain 58 for the possible routes based on the map data and the traffic data. "Metric of exertion," for the purposes of this disclosure, is a value representing how hard the powertrain 58 will work while traversing the route. The metric of exertion may be a total value for the route, an average value over the route, or a peak value over the route. The metric of exertion may be, e.g., energy consumption, average power consumption, average heat generation rate, peak power consumption, etc. For example, "predicted energy consumption," for the purposes of this disclosure, is an estimation by the computer 32 of an amount of energy that the powertrain 58 will expend for the first vehicle 30 to traverse a route. The predicted energy consumption is measured in units of energy such as Joules. The computer 32 may calculate the predicted energy consumption by estimating how much acceleration the first vehicle 30 will likely use to traverse each of the possible routes, based on intersections at which the first vehicle 30 will need to stop, speed limits along segments of the possible route, uphill portions of the possible route, etc. For example, the computer 32 may use this formula:

$$E = \sum_{l \in \{25,35,45,55,65\}} (I_l E_{acc \to l} + D_l E_l) + \sum_{i=1}^{N} E_{grad}(g_i)$$

in which l is a speed limit, $I_l$ is a number of intersections on the route at which the first vehicle 30 will stop before a section with a speed limit l, $E_{acc \to l}$ is an amount of energy to accelerate up to a speed l, $D_l$ is a distance of the route with a speed limit l, $E_l$ is an energy to maintain a speed l per unit distance, i is an index for each mile (or another distance segment) along the route, N is a total number of miles (or other distance segments) for the route, $g_i$ is a gradient (i.e., steepness, measured in e.g., angular units such as degrees) at mile i, and $E_{grad}$ is an additional energy to ascend a gradient for the distance segment above the energy to travel on level ground for the distance segment. The terms $E_{acc \to l}$, $E_l$, and $E_{grad}$ may be based on experimental data gathered while driving the first vehicle 30. For another example, "average power consumption," for the purposes of this disclosure, is an estimation by the computer 32 of an average power that the powertrain 58 will generate over the route. The average power consumption may be calculated, e.g., as the energy consumption divided by an estimated travel time of the route. Alternatively, the average power consumption may be calculated as an average or root-mean-square of expected power consumptions at, e.g., uniformly spaced points along the route. For another example, "average heat generation rate," for the purposes of the disclosure, is an estimation by the computer 32 of heat generated by the powertrain per unit distance or time along the route. The average heat generation rate may be calculated using a similar formula with terms determined by experimentation on how the powertrain 58 generates heat under different driving conditions, road environments, traffic scenarios, etc. For another example, "peak power consumption," for the purposes of this disclosure, is an estimation by the computer 32 of a maximum power that the powertrain 58 will produce while traversing the route. The memory of the computer 32 may store power consumption scores for different driving scenarios, and the computer 32 may calculate the peak power consumption by determining which driving scenario occurring along the route has the highest score. The computer 32 may calculate the metric of exertion of the possible routes in the process of using a route-planning algorithm such as Dijkstra's algorithm, A*, D*, and others, as are known. Specifically, the metric of exertion may be a metric optimized by the route-planning algorithm or may be a component of a metric optimized by the route-planning algorithm.

Next, in a block 455, the computer 32 selects a second route from among the possible routes that has the lowest metric of exertion (or the optimized value of a metric including the metric of exertion) and modifies the first route to the second route. The metric of exertion is therefore lower for the second route than for the first route.

Next, in a decision block 458, the computer 32 determines whether the first vehicle 30 is traveling as a member of a platoon. Membership status in a platoon may be stored in the memory of the computer 32. If the first vehicle 30 is not a member of a platoon, the process 400 proceeds to a block 475.

If the first vehicle 30 is a member of a platoon, next, in a decision block 460, the computer 32 determines whether the first vehicle 30 is towing a trailer. For example, the computer 32 may determine whether the tow attachment 54 is attached. If the first vehicle 30 is not towing a trailer, the process 400 proceeds to a block 470.

If the first vehicle 30 is towing a trailer, next, in a block 465, the computer 32 instructs the tow attachment 54 to detach the trailer. Alternatively, a message may be transmitted to an occupant to detach the trailer.

Next, or after the decision block 460 if the first vehicle 30 is not towing a trailer, in the block 470, the computer 32 transmits a request via the transceiver 50 to one of the second vehicles 90 to follow the second route. If the first vehicle 30 was towing a trailer, the computer 32 may also transmit a request that the second vehicle 90 tow the trailer. The first vehicle 30 may move so that the second vehicle 90 has space to attach the trailer; for example, the first vehicle 30 may drive forward by a preset distance. The preset distance may be stored in the memory of the computer 32. The preset distance may be chosen based on providing the second vehicle 90 sufficient space to parallel park between the first vehicle 30 and the trailer.

Next, or after the decision block 458 if the first vehicle 30 is not in a platoon, in a block 475, the computer 32 instructs the first vehicle 30 to begin following the second route. For example, the computer 32 may use the autonomous-driving algorithm to instruct the propulsion 34, steering 38, and brake system 36 to drive the first vehicle 30 along the second route. While doing so, the computer 32 may also implement the process 300 described above and/or the process 500 described below.

Next, in a block 480, while following the second route, the computer 32 receives a number of vehicles following the first vehicle 30. The number of following vehicles may exclude the second vehicles 90 in the platoon with the first vehicle 30; in other words, the number of following vehicles may include only vehicles unrelated to the platoon. The computer 32 may receive data from the AV sensors 46 and interpret the data to determine the number of following vehicles using known image analysis and/or other object-recognition techniques.

Next, in a decision block 485, the computer 32 determines whether the number of following vehicles exceeds a following-vehicle threshold, e.g., three. The following-vehicle threshold may be determined by user input or may be a preset value. The preset value for the following-vehicle threshold may be based on surveying customer preference. If the number of following vehicles does not exceed the following-vehicle threshold, the process 400 proceeds to a decision block 490.

If the number of following vehicles exceeds the following-vehicle threshold, next, in a block 490, the computer 32 instructs the first vehicle 30 to pull over until the following vehicles have passed the first vehicle 30. For example, the computer 32 may use the autonomous-driving algorithm to instruct the propulsion 34, steering 38, and brake system 36 to move the first vehicle 30 to a shoulder or side of a road on which the first vehicle 30 is driving, slow and stop the first vehicle 30, wait until the following vehicles have passed, and accelerate the first vehicle 30 back onto the road.

After the decision block 485, if the number of following vehicles does not exceed the following-vehicle threshold, or after the block 490, the computer 32 determines whether the first vehicle 30 has arrived at the destination. The computer 32 may use, e.g., GPS data from the AV sensors 46 to compare the location of the first vehicle 30 to the location of the destination. If the first vehicle 30 is not at the destination, the process 400 returns to the block 475 to continue following the second route. If the first vehicle 30 is at the destination, the process 400 ends.

Figure 5:
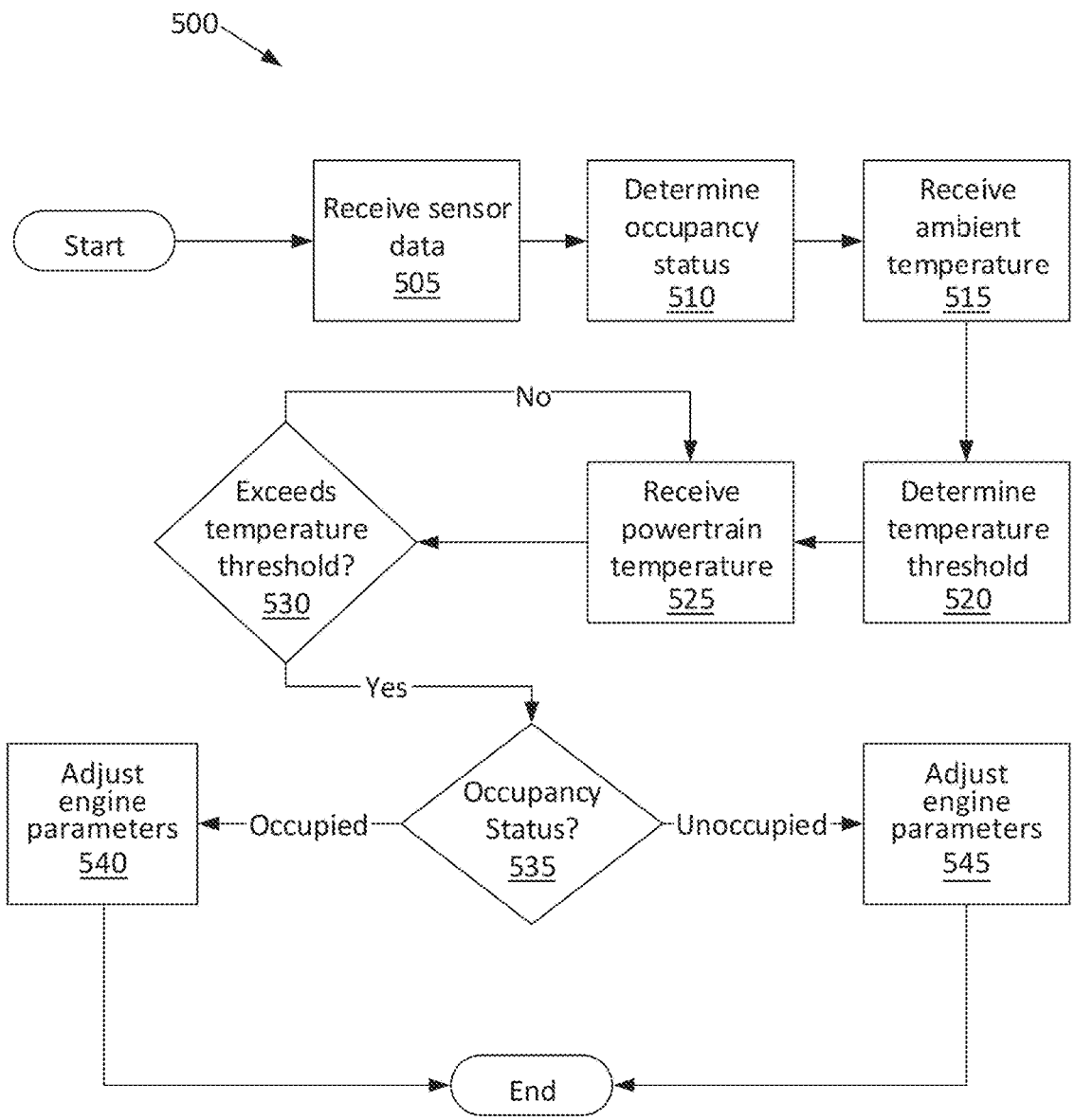
FIG. 5 is a process flow diagram of an example process for adjusting powertrain parameters based on powertrain conditions.

FIG. 5 is a process flow diagram illustrating an exemplary process 500 for planning a route based on powertrain conditions. The memory of the computer 32 stores programming for performing the steps of the process 500.

The process 500 begins in a block 505, in which the computer 32 receives sensor data from the occupancy sensors 48. The sensor data may be images from cameras directed at the seats 42, weight values from weight sensors in the seats 42, binary signals from sensors detecting whether seatbelts for the seats 42 are buckled or unspooled, etc.

Next, in a block 510, the computer 32 determines an occupancy status of the vehicle 30 based on the sensor data. "Occupancy status," for the purposes of this disclosure, is a classification based on the presence, location, number, etc. of occupants in the passenger cabin 40. For example, the occupancy status may be one of an occupied status, i.e., at least one occupant in the passenger cabin 40, and an unoccupied status, i.e., zero occupants in the passenger cabin 40. The computer 32 uses the sensor data to determine the occupancy status. For example, the computer 32 may have object recognition algorithms to recognize an occupant in one of the seats 42 based on images from cameras by, e.g., comparing the images to baseline images. For another example, the computer 32 may receive a weight above a weight threshold from at least one weight sensor in one of the seats 42. The weight threshold may be chosen to be low enough that, e.g., 99% of a population of possible occupants are heavier. For another example, a binary signal from a sensor in at least one seatbelt buckle indicates that the buckle is buckled.

Next, in a block 515, the computer 32 receives an ambient temperature. The external thermometer 56 detects the ambient temperature and transmits a signal through the communications network 44 to the computer 32.

Next, in a block 520, the computer 32 determines a temperature threshold, as described above with respect to the block 420 of the process 400.

Next, in a block 525, the computer 32 receives a temperature of the powertrain 58. The powertrain thermometer 52 detects the powertrain temperature and transmits a signal through the communications network 44 to the computer 32.

Next, in a decision block 530, the computer 32 determines whether it has received data indicating a critical condition of the powertrain 58. The critical condition may be that the temperature of the powertrain 58 exceeds the temperature threshold, in other words, that the powertrain 58 is overheating. If the temperature of the powertrain 58 does not exceed the temperature threshold, the process 500 returns to the block 525; that is, the computer 32 continues to monitor the temperature of the powertrain 58.

Next, in a block 535, the computer 32 determines the occupancy status. The occupancy status determined in the block 510 may be stored in the memory of the computer 32. If the occupancy status is the unoccupied status, the process 500 proceeds to the block 545.

If the occupancy status is the occupied status, next, in a block 540, the computer 32 adjusts one or more parameters of the powertrain 58. The parameters are values governing operation of the powertrain, and typically include engine speed, cylinder deactivation, transmission-shift time, and threshold to shift of a shift schedule. For example, the computer 32 may increase the engine speed. A higher engine speed can, in the event of a leak of coolant, pump more air through the engine 60 as a substitute coolant. The engine speed varies during operation of the vehicle 30, but the engine speed is increased beyond a default value for any value of torque demanded from the engine. For another example, the computer 32 may increase cylinder deactivation, i.e., fire fewer cylinders 64 in the firing sequence, e.g., four cylinders 64 instead of six cylinders 64. For another example, the computer 32 may decrease the transmission-shift time. The computer 32 may, for example, increase the pressure in the hydraulic system for gear shifting. The time to shift gears may decrease, e.g., from 0.5 seconds to 0.3 seconds. For another example, the computer 32 may adjust the threshold to shift of the shift schedule to increase lugging, i.e., lowering the engine speed or raising the gear for a given demanded torque. For a given acceleration demand, the threshold to shift may be a function of speed of the vehicle 30 and whether the shift is an upshift or a downshift. After the block 540, the process 500 ends.

If the occupancy status is the unoccupied status, in the block 545, the computer 32 adjusts one or more parameters of the powertrain 58 to a more extreme value than for the occupied status, i.e., than in the block 540. The more extreme values may increase the NVH in the passenger cabin 40, but the passenger cabin 40 does not contain occupants that would experience the increased NVH. For example, the computer 32 may increase the engine speed more for the unoccupied status than for the occupied status. For another example, the computer 32 may increase they cylinder deactivation more for the unoccupied status than for the occupied status, e.g., three cylinders 64 instead of six cylinders 64. For another example, the computer 32 may decrease the transmission-shift time more for the unoccupied status than for the occupied status, e.g., from 0.5 seconds to 0.2 seconds, which may reduce friction heat created during the shift and that results in a larger NVH torque disturbance. For another example, the computer 32 may adjust the threshold to shift of the shift schedule to increase lugging more for the unoccupied status than for the occupied status. After the block 545, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising a computer programmed to:
   cap power provided by a powertrain to a power limit in response to data indicating a critical condition of the powertrain; and
   provide power from the powertrain above the power limit in response to a demand for acceleration above an acceleration threshold while the data indicate the critical condition of the powertrain.

2. The system of claim 1, wherein the computer is further programmed to cap power provided by the powertrain above the power limit to an energy limit.

3. The system of claim 1, wherein the power limit is a fraction less than one of power demanded from the powertrain.

4. The system of claim 1, wherein the power limit is a preset power value.

5. The system of claim 1, wherein the critical condition is a temperature of the powertrain exceeding a temperature threshold.

6. The system of claim 5, wherein the power limit is a fraction less than one of power demanded from the powertrain.

7. The system of claim 6, wherein the temperature threshold is a first temperature threshold, and the computer is further programmed to cap power provided by the powertrain to a preset power value in response to data indicating that the temperature of the powertrain exceeds a second temperature threshold.

8. The system of claim 7, wherein the second temperature threshold is greater than the first temperature threshold.

9. The system of claim 6, wherein the fraction is a first fraction and the temperature threshold is a first temperature threshold, the computer is further programmed to cap power provided by the powertrain to a second fraction of power demanded from the powertrain in response to data indicating that the temperature of the powertrain exceeds the second temperature threshold, the second fraction is less than the first fraction, and the second temperature threshold is greater than the first temperature threshold.

10. The system of claim 5, wherein the computer is further programmed to determine the temperature threshold based on an ambient temperature.

11. A method comprising:
    capping power provided by a powertrain to a power limit in response to data indicating a critical condition of the powertrain; and
    providing power from the powertrain above the power limit in response to a demand for acceleration above an acceleration threshold while the data indicate the critical condition of the powertrain.

12. The method of claim 11, further comprising capping power provided by the powertrain above the power limit to an energy limit.

13. The method of claim 11, wherein the power limit is a fraction less than one of power demanded from the powertrain.

14. The method of claim 11, wherein the power limit is a preset power value.

15. The method of claim 11, wherein the critical condition is a temperature of the powertrain exceeding a temperature threshold.

16. The method of claim 15, wherein the power limit is a fraction less than one of power demanded from the powertrain.

17. The method of claim 16, wherein the temperature threshold is a first temperature threshold, and the method further comprises capping power provided by the powertrain to a preset power value in response to data indicating that the temperature of the powertrain exceeds a second temperature threshold.

18. The method of claim 17, wherein the second temperature threshold is greater than the first temperature threshold.

19. The method of claim 16, wherein the fraction is a first fraction and the temperature threshold is a first temperature threshold, and the method further comprises capping power provided by the powertrain to a second fraction of power demanded from the powertrain in response to data indicating that the temperature of the powertrain exceeds the second temperature threshold, wherein the second fraction is less than the first fraction, and the second temperature threshold is greater than the first temperature threshold.

20. The method of claim 15, further comprising determining the temperature threshold based on an ambient temperature.

* * * * *